Feb. 11, 1964   A. C. DENISOFF   3,120,742
TANK COOLING SYSTEM
Filed Oct. 17, 1961   4 Sheets-Sheet 1

INVENTOR
Alexander C. Denisoff
By Watson, Cole, Grindle & Watson
ATTORNEY

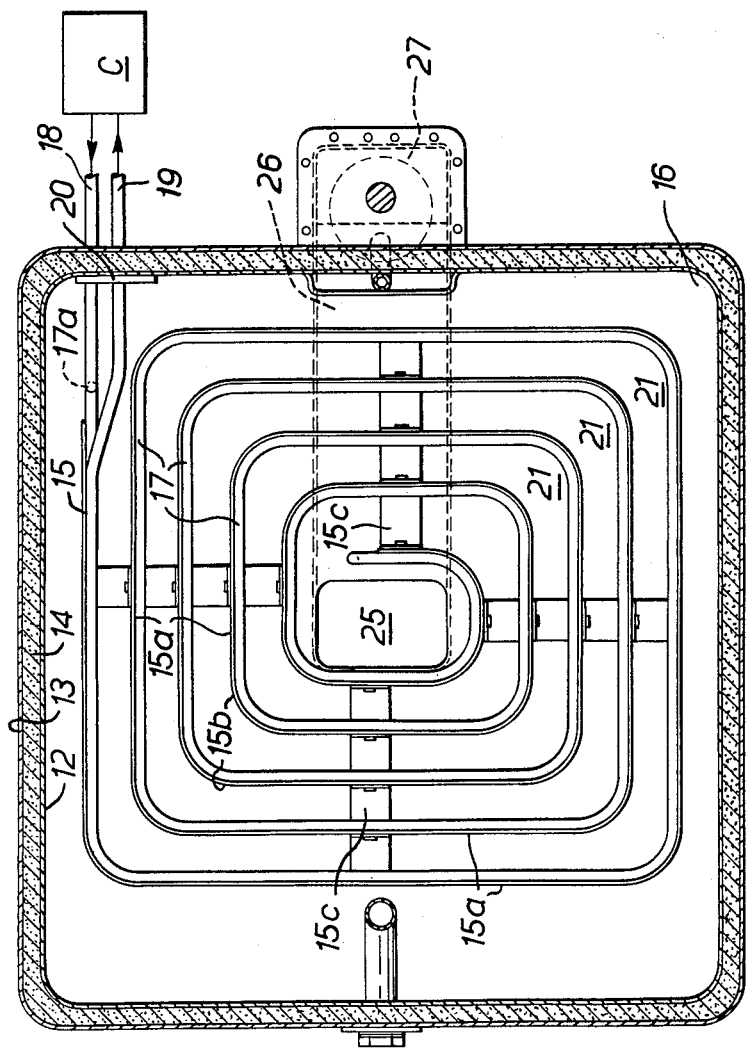

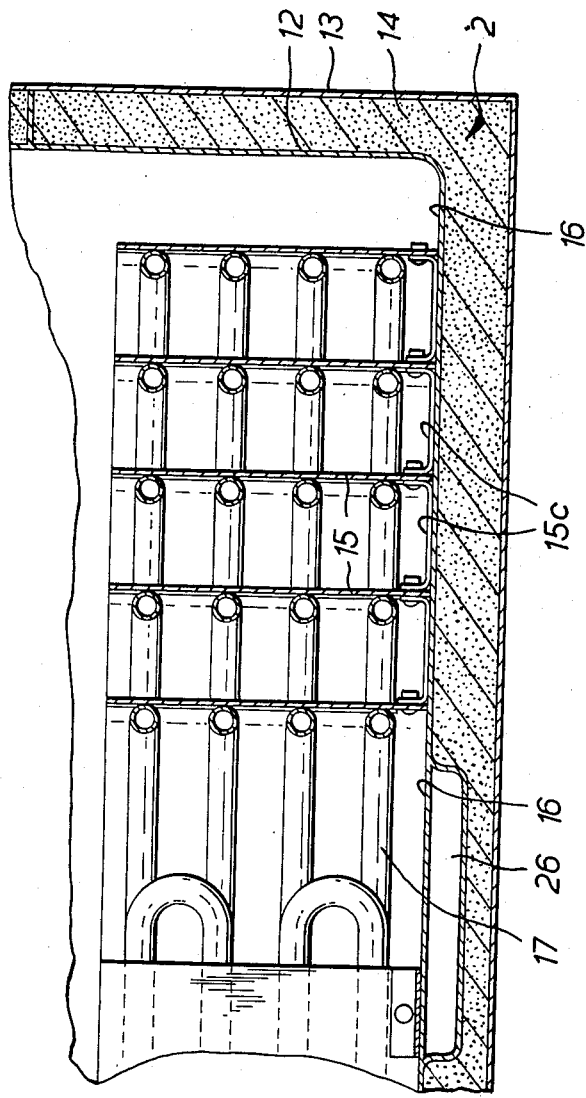

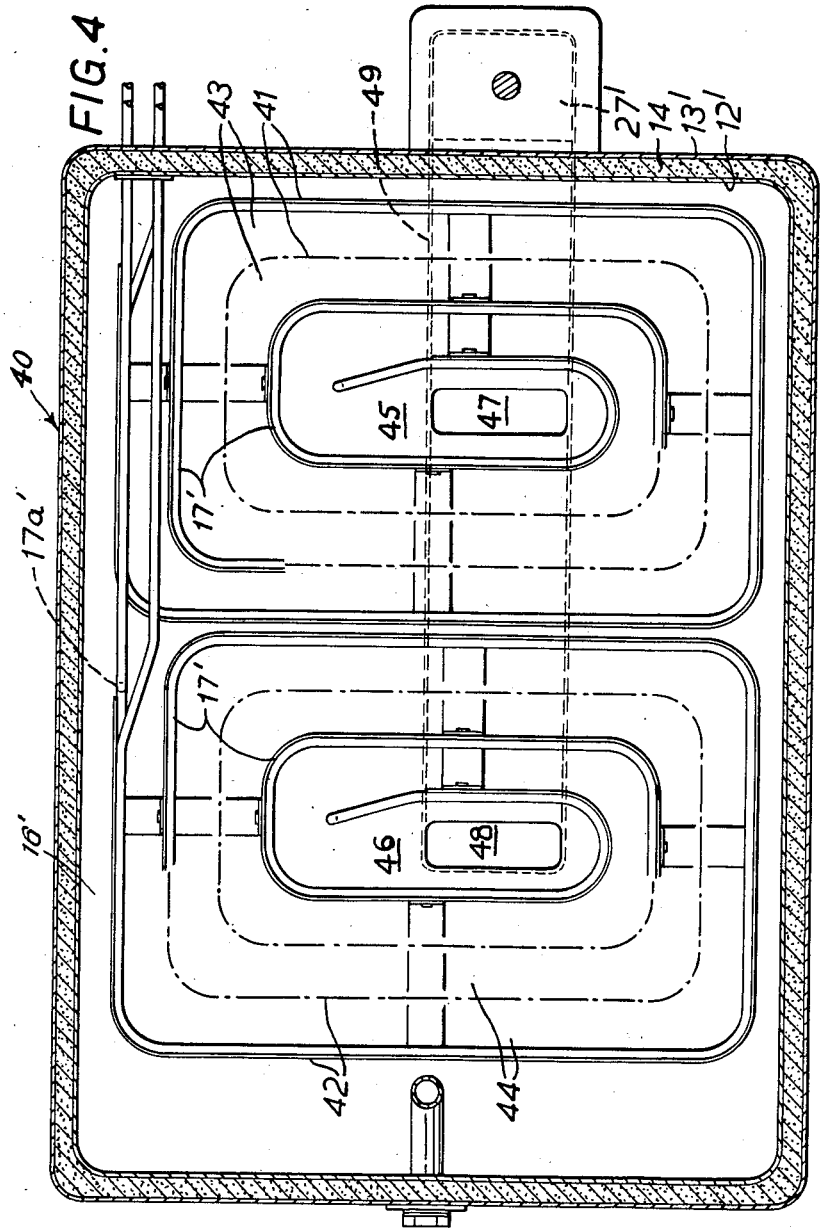

United States Patent Office 3,120,742
Patented Feb. 11, 1964

3,120,742
TANK COOLING SYSTEM
Alexander Constantine Denisoff, 28/B St. George's Road,
East Twickenham, England
Filed Oct. 17, 1961, Ser. No. 145,589
Claims priority, application Great Britain Oct. 24, 1960
5 Claims. (Cl. 62—434)

This invention relates to apparatus comprising a liquid-containing tank and ducting to convey liquid under gravity from an outlet in the tank.

The invention is concerned more particularly with ice bank apparatus for the intermittent supply of chilled water, that is, apparatus comprising a tank having an outlet in the bottom thereof and being adapted to receive water remote from the outlet, the tank having means for forming an ice bank in the tank when the water therein is stationary which ice bank is such as not to interrupt flow of water to the outlet when chilled water is required and which by gradual melting cools such water. The invention will be described in relation to ice bank apparatus but it should be appreciated that it has wider application.

In the complete specification of my Letters Patent No. 3,034,318, issued May 15, 1962, there is described an ice bank apparatus wherein the ice-bank-forming means provides in the tank a tortuous open-topped generally horizontal channel through which water flows under gravity towards the outlet, and a pasage for refrigerant which is disposed whereby to cool water in said channel: the channel is preferably spiral wth the outlet located centrally thereof.

The effectivenes of a given size of ice bank apparatus as specified in the preceding paragraph depends on the rate at which water can be made to flow through it. If the outlet duct is a vertical pipe connected to a pump at the side of the tank by means of an elbow, serious difficulties are encountered if it is attempted to increase the flow beyond a given rate, mainly due to air getting into the pipe and pressure loss in the elbow. Increasing the pipe diameter and the radius of the elbow are not entirely satisfactory answers to the problem, especially if as is usually the case the ice bank apparatus is subject to a height limitation. Once again it will be appreciated that this problem is not exclusive to ice bank apparatus.

The object of the present invention is to provide, in apparatus as above specified, an arrangement of ducting which overcomes the difficulties referred to.

The invention accordingly provides in the above specified apparatus an outlet in the form of an opening in the bottom wall of the tank and a duct leading away from the outlet beneath and close to the bottom wall of the tank in a generally horizontal direction, the duct having a width at least several times greater than its height.

One practical form of apparatus according to the invention will now be described by way of example, with reference to the accompanying drawings, in which:

FIG. 2 is a horizontal section of the FIG. 1 apparatus with the inner pan removed, taken on the line II—II of FIG. 1;

FIG. 3 is a partial vertical section of the FIG. 1 apparatus, taken on the line III—III of FIG. 1, and FIG. 4 is a horizontal section of an ice bank apparatus being a modified form of what is shown in FIGS. 1 to 3.

Figure 1:
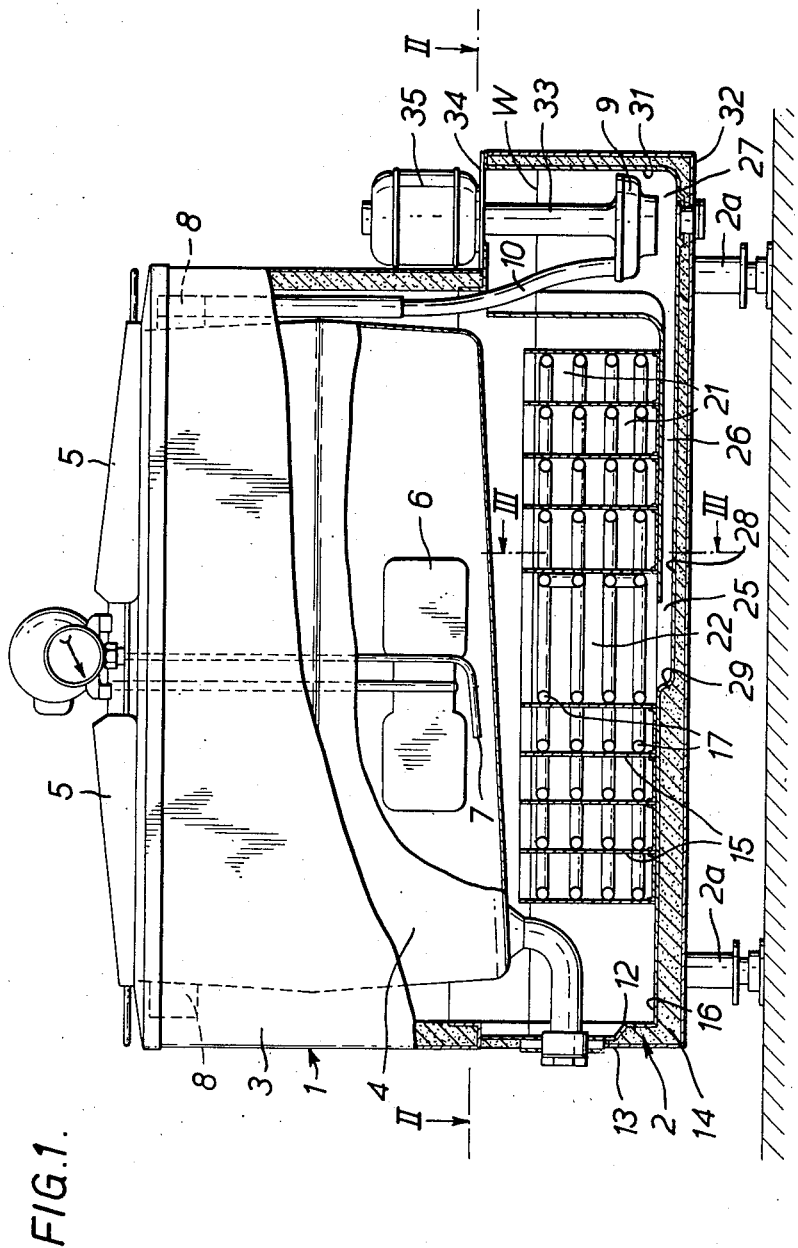
FIG.1 is an elevation of a milk cooling apparatus incorporating an ice bank apparatus according to the invention, various parts being shown cut away so that the ice bank apparatus itself is seen in vertical section.

Referring to the drawings, the apparatus there shown comprises an insulated container designated generally 1 and including a lower part or tank 2 supported on adjustable feet 2a, and an upper part 3. Within the container 1 is an inner pan 4 to contain milk; the inner pan has a pair of hinged covers 5 permitting access to its interior, and is provided with a motor-driven stirrer 6 and a thermometer 7. The inner pan 4 is spaced on all four sides from the interior of the upper part 3 of the container 1 and is surrounded adjacent its upper edge by a spray pipe device 8 supplied with chilled water from a pump 9 through a flexible pipe 10. The water from the device 8 plays on to the four sides of the inner pan 4 and drops down into the tank 2, mostly about the periphery thereof.

The tank 2 comprises an inner shell 12 made in one piece from resin-impregnated fiberglass and providing liquid containing side walls and a bottom wall 16, and an outer shell 13, the space betwen these two shells being packed with insulating material 14. The outer shell may be constructed as a framework of angle-iron or other structural-steel members carrying sheet steel panels. The insulating material can be granulated cork or expanded plastics material. A sheet metal wall 15, which may consist of a single piece of strip or of several pieces, is arranged vertically within the tank 2: the wall 15, seen in plan (FIG. 2) has a generally spiral configuration and consists of a series of straight sections 15a each joined to the next by curved sections 15b of generous radius and each running at right angles to the adjacent straight sections. All the straight sections 15a parallel to a given direction are connected together by brackets 15c lying against the bottom wall 16 of the tank. Two interconnected loops of refrigerant pipe 17 are supported upon the wall 15 e.g. by being brazed thereto; the loops provide four pipe runs each extending over the whole length of the wall 15. The return bend joining the loops is shown at 17a. The free ends 18, 19 of the pipe 17 are brought out through the tank wall at 20 and connected to a compressor unit which forms no part of the present invention and is indicated diagrammatically only at C. Refrigerant is thus supplied at one end 18 of the pipe 17 and travels along the wall 15 to the center of the spiral and returns therefrom along the wall to the return bend 17a: it then travels a second time to the center of the spiral and back again and leaves at 19. In the course of this the refrigerant evaporates and absorbs heat from its surroundings. By reason of the intimate connection of the pipes 17 to the wall 15 the latter provides an extension of their heat-exchanging surface. However the main function of the wall 15 is to provide a channel 21 which is spiral, open-topped and generally horizontal and leads from the peripheral area of the tank 2, where most of the water reaches it after flowing over the pan, to a central space 22 which is approximately rectangular in plan. The water level in the tank part 2 when the ice is melted and the water is not flowing is shown at W in FIG. 1.

The bottom wall 16 of the tank is open over almost the whole area of the central space 22 to provide an outlet 25 from the spiral channel 21. A duct 26 is formed beneath the bottom wall which extends from the outlet 25 to a sump 27 at one side of the tank 2, the width of the duct being equal to the length of the long side of the outlet 25 and the upper wall of the duct being provided by the bottom wall 16 of the tank 2; the height of the duct, which is of rectangular section, is several times less than its width, typical figures for height and width being 1" and 10" respectively. The lower wall of the duct 28 slopes gently upwardly at 29 to join the edge of the outlet opposite the sump.

The sump 27 is conveniently formed as an extension of the tank 2 with a liquid-containing inner wall 31 constructed as an integral part of the inner shell 12, and an outer wall 32 rigidly connected with the outer shell 13. The pump 9 previously referred to, which is of the centrifugal type, is located in the sump 27 and supported by means of a tube 33 depending from a cover plate 34 which closes the top of the sump and is mounted on the outer wall 32 thereof. A driving motor 35 for the pump 9 is mounted on the cover plate 34 so as to be outside the refrigerated enclosure: motor 35, plate 34, tube 33 and pump 9 form a unit removable as a whole.

FIG. 4 shows a modified form of milk cooling apparatus having a larger capacity than that of FIGS. 1 to 3. The apparatus includes a tank of which only the lower part 40 is shown. It is to be understood that the upper part of the tank is similar to what is shown in FIG. 1 except in dimensions.

The lower tank part 40, like that of FIGS. 1 to 3, is constructed as an inner and an outer shell, designated 12', 13' respectively, sandwiching insulating material 14. While the lower tank part 2 of FIGS. 1 to 3 contains only one spiral wall, the tank part 40 of FIG. 4 contains two such walls which are similar and designated 41, 42. Each wall 41, 42 is constructed like the wall 15 of FIGS. 1 to 3 and carries two interconnected loops of refrigerant pipe: the same numerals—distinguished by a prime—are used for these parts in FIG. 4 as are used in the other figures and no further description thereof will be necessary. The walls 41, 42 form two spiral channels 43, 44 leading to central generally rectangular spaces 45, 46, and the liquid-containing bottom wall 16' of the tank part 40 is cut away over a substantial part of each space to form a rectangular outlet from each, these outlets being similar and shown at 47, 48. Both outlets communicate with a duct 49 leading to a sump 27', which is similar to the sump 27 of FIGS. 1 to 3. The duct 49 is rectangular in section and has the same width as the long side of each outlet 47, 48. The height of the duct 49 is several times smaller than its width and is calculated to be sufficient to take the total flow through both outlets 47, 48. It should however be appreciated that the critical aspect of the design of the duct is the flow through the outlet.

As in FIGS. 1 to 3 the bottom wall 16' of the tank part 40 forms the upper wall of the duct, and the lower wall slopes gently upwardly up to the long side outlet 48 remote from the sump 27'.

The invention enables the duct from the outlet to the sump to have a much greater cross section than could be provided conveniently by a pipe and it also enables the outlet to be large and to lead without constriction into the duct. The duct described dispenses, in effect, with a bend such as would cause a pressure loss, and adds very little height to the total height of the apparatus. Moreover it facilitates the general design of the apparatus since the duct can be accommodated within the thickness of insulation provided between inner and outer shells forming the tank of the ice bank apparatus.

Another advantage of the construction described lies in the simplicity with which the sump can be formed so that the circulating pump may depend into it. The use of a pipe to lead water to the pump makes it difficult to avoid a flanged or other joint to the pump body: such a joint however hinders the replacement of the pump should a fault develop especially if the pump is thermally insulated, as is desirable, and as is the case in the constructions described. As already described, in these constructions if the pump has to be inspected or replaced the cover plate for the sump is simply removed so as to lift the pump therefrom.

It is not necessary that the bottom wall of the tank should form the upper wall of the duct and a separate upper wall could be provided, spaced, if desired, from the bottom wall of the evaporator. In another alternative construction to that specifically described the whole width of the tank can be utilized for the duct.

I claim:

1. In ice bank apparatus including a tank having a bottom wall and an outlet opening therein, an evaporator within the tank, means defining with the tank bottom wall a horizontal open-topped channel to lead water flowing under gravity from an inlet region of said tank over the evaporator to said outlet, and means circulating water between the outlet and the inlet region; duct wall means beneath the tank bottom wall and therewith defining a duct leading generally horizontally from the outlet to the circulating means, said duct having a width at least several times greater than its height.

2. Apparatus as claimed in claim 1, wherein the width of the duct equals the width of the outlet opening.

3. Apparatus as claimed in claim 1, including a layer of thermal insulation at the underside of the tank bottom wall, said duct being accommodated within the thickness of said layer.

4. Ice bank apparatus including a tank having a bottom wall and a plurality of spaced outlet openings in said bottom wall, an evaporator within the tank, means defining with the tank bottom wall a plurality of horizontal open-topped channels through each of which water is led under gravity from an inlet region to a corresponding one of said outlet openings, means circulating water between the outlet openings and the inlet regions, and duct wall means beneath the tank bottom wall and defining with said wall a duct having a width of at least several times greater than its height, said duct communicating with each of said outlet openings and leading water therefrom to the circulating means.

5. Ice bank apparatus including a tank having a bottom wall with at least one outlet opening therein, an evaporator within the tank, metal strip defining with said tank bottom wall at least one horizontal open-topped spiral channel leading water under gravity from an inlet region to the outlet opening in the tank bottom wall, the area of said outlet opening being substantially equal to the area defined by the center of the spiral, a sump at one side of the tank, duct means co-operating with the underside of the tank bottom wall to define a duct having a width substantially equal to that of the outlet opening, said width being several times the height of the duct and the duct leading from the outlet to the sump, and a pump drawing water from the sump for circulation to the inlet region of the channel.

References Cited in the file of this patent
UNITED STATES PATENTS

| | | |
|---|---|---|
| 417,467 | Braun | Dec. 17, 1889 |
| 2,677,531 | Hock et al. | May 9, 1954 |
| 2,785,545 | Pusey | Mar. 19, 1957 |
| 2,840,996 | Steinhorst et al. | July 1, 1958 |